Oct. 19, 1965    R. ADELL    3,212,660
DEVICE FOR HOLDING ADDITIVE FOR MOTOR
VEHICLE WINDSHIELD WASHING LIQUID
Filed Aug. 25, 1964    3 Sheets-Sheet 1
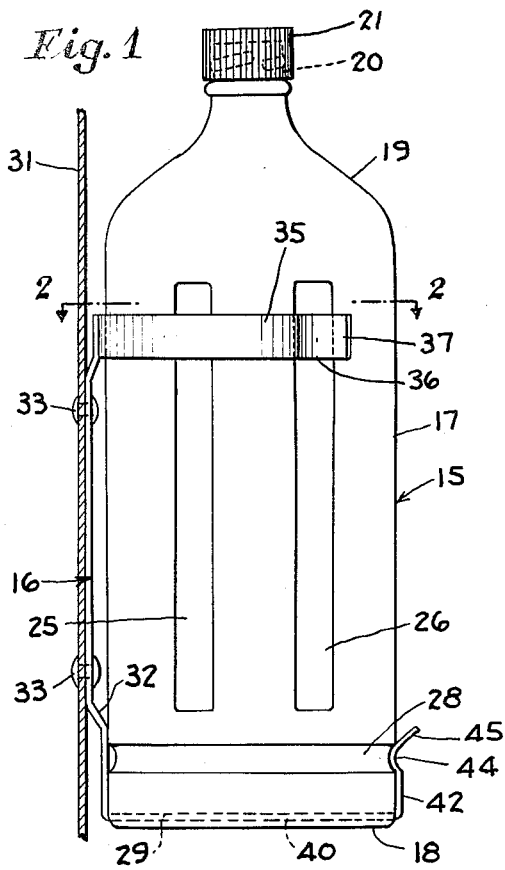
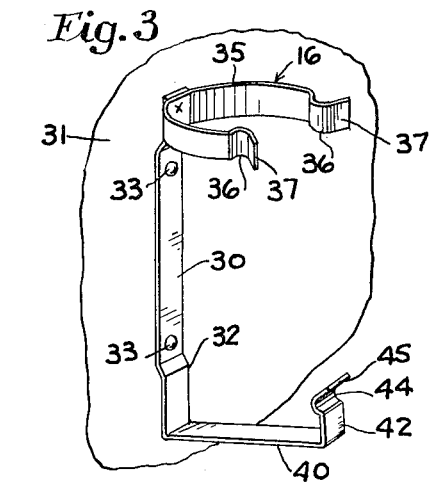
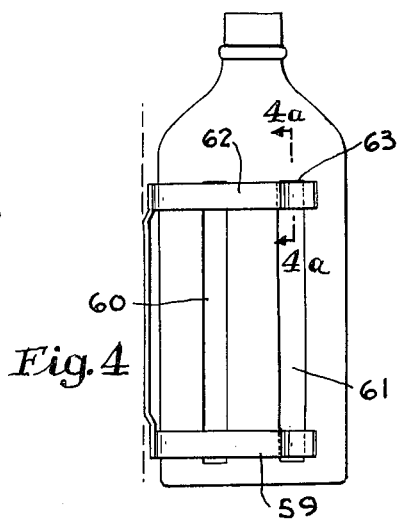
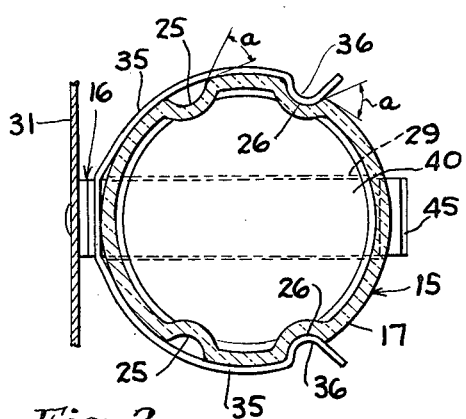
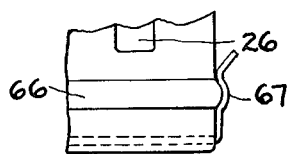
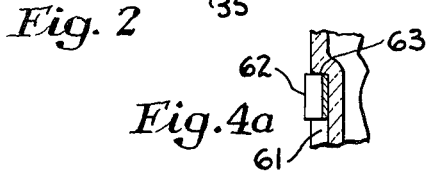
INVENTOR.
ROBERT ADELL
BY
Gregory S. Dolgorukov
ATTORNEY Oct. 19, 1965  R. ADELL  3,212,660
DEVICE FOR HOLDING ADDITIVE FOR MOTOR
VEHICLE WINDSHIELD WASHING LIQUID
Filed Aug. 25, 1964  3 Sheets-Sheet 2
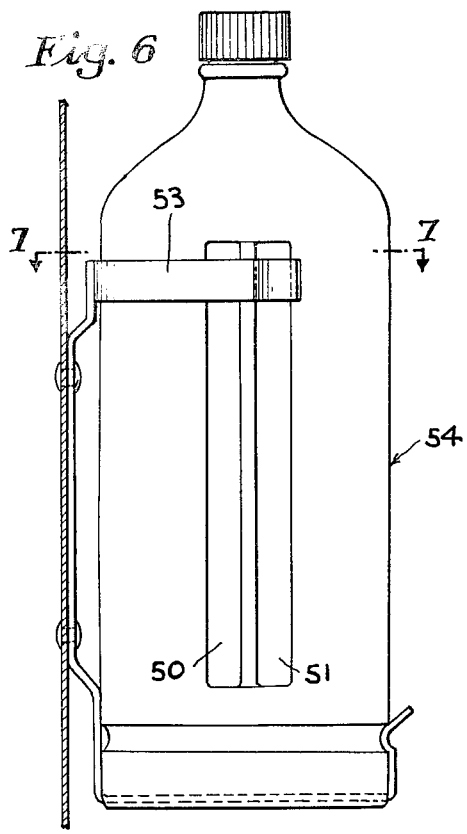
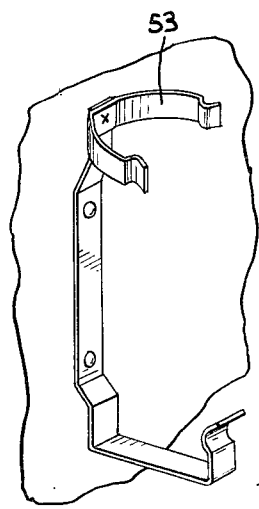
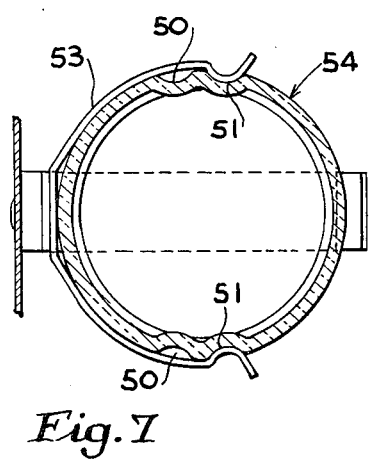
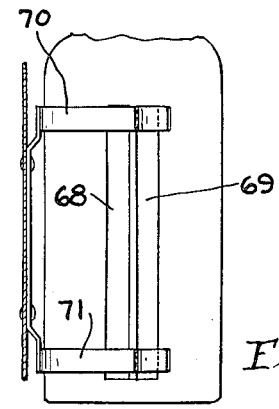
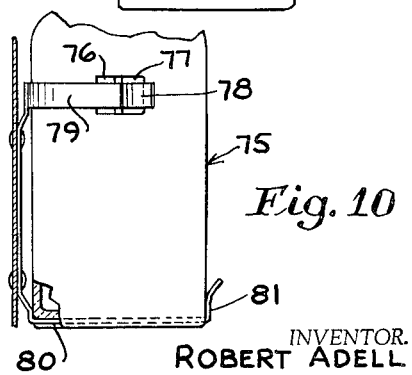
INVENTOR.
ROBERT ADELL
BY
Gregory S. Dolgorukov
ATTORNEY Oct. 19, 1965  R. ADELL  3,212,660
DEVICE FOR HOLDING ADDITIVE FOR MOTOR
VEHICLE WINDSHIELD WASHING LIQUID
Filed Aug. 25, 1964  3 Sheets-Sheet 3

INVENTOR.
ROBERT ADELL
BY Gregory S. Dolgorukov
ATTORNEY

United States Patent Office 3,212,660
Patented Oct. 19, 1965

3,212,660
DEVICE FOR HOLDING ADDITIVE FOR MOTOR
VEHICLE WINDSHIELD WASHING LIQUID
Robert Adell, Detroit, Mich., assignor to Adell Chemical
Corporation, Detroit, Mich., a corporation of Michigan
Filed Aug. 25, 1964, Ser. No. 391,867
3 Claims. (Cl. 215—1)

This invention relates to an improved device for storing therein additive for the liquid used in windshield washer mechanisms of motor vehicles.

It is now well appreciated that the former practice of keeping a bottle of such additive in the glove compartment of a motor vehicle, such as a passenger automobile, has numerous and serious disadvantages, and that storing such liquid away from the passenger or driver compartment of the vehicle offers a number of important advantages.

Storing such liquid in a suitable container in an engine compartment, i.e. under the engine hood of the vehicle offers particularly attractive advantages. However, providing a device which is convenient in use and which can be suspended under the engine hood in a manner preventing rattling, and which is held therein so securely as to present no danger of falling out into the engine even on the roughest roads, present a number of serious difficulties and problems. This is due to the fact that the requirement of secure and tight holding of the device is coupled with the contradictory requirement that the additive container must be easily removable from its mounting or suspension means and returnable in place without exertion of an appreciable effort. In addition, it is also necessary to have the container so constructed as to afford an easy hand grip thereon and present no danger of slipping out of the user's hands even if it is held lightly, particularly when the hands of the user are oily or greasy because of previous handling of oil or grease covered objects, as is customary with filling and service station attendants.

One of the objects of the present invention is to provide an improved device of the above nature whereby the above difficulties and disadvantages are overcome and largely eliminated without introducing any new problems or increasing in an appreciable manner the costs involved.

Another object of the present invention is to provide an improved bottle or container for the liquid additive for the water used in windshield washers and improved suspension means therefor adapted to be installed under the engine hood of almost any motor vehicle, utilizing whatever available space may be found therein, and without being limited to any specific location or position.

A further object of the present invention is to provide an improved device of the above nature in which the bottle or similar container cooperates with its suspension means or holder bracket in such a manner that the bottle is held securely therein with virtually all of its movements being resisted in a substantially positive manner but cushioned by the body resiliency of the holder bracket, with only the movements of the bottle in the direction of withdrawal thereof being resisted yieldingly and resiliently.

A still further object of the invention is to provide a device of the foregoing nature including a bottle having grooves engageable by the holder bracket when the bottle is not in use, with said grooves providing convenient finger recesses facilitating withdrawing and holding of the bottle and making it unnecessary to squeeze the bottle for making the hold on the bottle secure, and with the end walls of the grooves providing stops should the bottle slip some distance in the user's hand.

A still further object of the present invention is to provide an improved device of the foregoing character including a bottle having a substantially maximum volume or holding capacity, in its over-all dimensions, which capacity is not reduced by the necessity to provide waist portion to form a convenient hand hold with a shoulder.

A still further object of the present invention is to provide an improved device of the foregoing character including a bottle and a holder bracket therefor, the cooperation between said bottle of the bracket being such that the resilient and yielding resistance to disengagement of the bottle continued through an increased distance.

A still further object of the present invention is to provide an improved device of the foregoing character including a bottle which may go into the bracket in a plurality of positions, such as two or four, and in which sufficient space remains on the bottle in the installed position thereof for the identification and instruction label.

A further object of the present invention is to provide an improved device of the above nature which is simple and rugged in construction, dependable in operation and is relatively inexpensive to manufacture.

Further objects and advantages of this invention will be apparent from the following description and appended claims, reference being had to the accompanying drawings forming a part of this specification, wherein like reference characters designate corresponding parts in the several views.

FIG. 1 is an elevational view of the device mounted on a supporting wall, such as a wall in an engine compartment of a vehicle.

FIG. 2 is a sectional view taken in the direction of the arrows on the section plane passed through the section line 2—2 of FIG. 1.

FIG. 3 is a perspective view of the holder bracket shown separately in its operative position on the supporting wall.

FIG. 4 is a view similar in part to FIG. 1 but showing the device with a bracket of a modified construction.

FIG. 4a is a fragmentary sectional view taken in the direction of the arrows on the section plane passed through the section line 4a—4a of FIG. 4.

FIG. 5 is a fragmentary elevational view showing the lower right-hand corner of the construction similar to that shown in FIG. 1 but having a peripheral raised bead instead of a peripheral groove.

FIG. 6 is a view similar in part to FIG. 1 but showing a device including a bottle having its vertically extending grooves arranged in pairs on both sides of the bottle with the grooves of each pair being arranged closely adjacent to each other.

FIG. 7 is a sectional view taken in the direction of the arrows on the section plane passed through the section line 7—7 of FIG. 6.

FIG. 8 is a perspective view showing separately the holder bracket of the construction of FIG. 6.

FIG. 9 is an elevational view similar in part to FIG. 6 but showing the holder bracket of a modified construction.

FIG. 10 is a view similar in part to FIG. 9 but showing the device in which the bottle and the holder bracket are still of a further modified construction.

Figure 11:
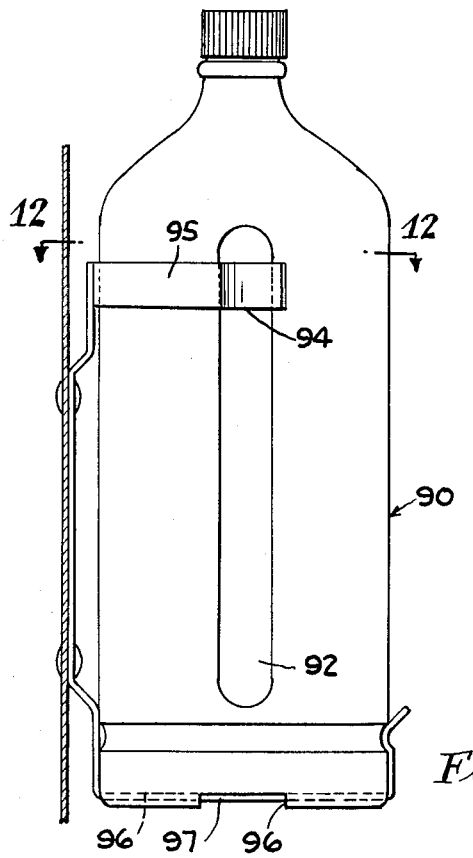
FIG. 11 is an elevational view showing the improved device of a still further modified construction and having a bottle of a square cross section with rounded corners and with only one pair of centrally arranged grooves.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraselogy and terminology employed herein is for the purpose of description and not of limitation.

In the drawings there are shown, by way of example, a number of devices of the above nature embodying the present invention. Referring specifically to FIGS. 1–3, the device illustrated therein comprises a bottle 15 adapted to be received by a bracket generally designated by the numeral 16. The bottle 15 comprises a cylindrical body 17 having a bottom 18 and a dome portion 19 converging to form a neck or throat 20 adapted to be closed with a cap 21, in a manner well known in the art. Along the body portion 17, and parallel to the longitudinal axis of the bottle, there is provided two pairs of grooves extending substantially throughout the entire length of the body portion 17. The grooves of the pair closer to the bracket are designated by the numeral 25 and are hereinafter referred to as the "near pair"; the grooves of the other pair or "far pair" are designated by the numeral 26. The grooves 25 and 26 are of an arcuate cross section but with the length of their arcs being less than one-half of the circle of that particular diameter. This is necessary in order to have the walls of such grooves at their junctions with the cylindrical body 17 forming angles $a$ of approximately 50–40 degrees in order to provide proper resistance to withdraw the bottle as explained below.

Adjacent to the bottom 18 of the bottle there is provided a peripheral groove 28 extending along the body 17 for the purposes explained below. On the under surface of the bottom 18 there is provided a diametral recess 29 extending from one side of the bottle clear to the other side thereof. The longitudinal axis of the recess 29 crosses the longitudinal axis of the bottle as is best illustrated in FIG. 2. The bottle is made from any suitable material, preferably transparent, such as glass or plastic.

The holder bracket 16 comprises an elongated piece 30 of resilient material, such as spring steel. The middle portion of the piece 30 is stamped out as illustrated to insure better contact of the bracket with the supporting wall 31 and to provide a guiding ramp 32 for the bottom of the bottle. The portion 30 is provided with holes adapted to receive suitable connectors such as rivets 33. Rivets such as 33 may be used when the bracket is installed as original equipment in the vehicle. However, when the bracket is intended to be installed in the vehicle already on the road, self-tapping screws or suitable bolts may be used.

To the top end of the piece 30 there is secured in any suitable manner, such as by riveting, or by spot welding as shown, a C-shaped bottle-embracing clip 35 having its middle portion secured to the end of the piece 30 as mentioned, and its free ends formed to provide curls 36 adapted to fit into the grooves of the far pair of the grooves 26. The extremities or the free ends of the clip 35 are bent outwardly as shown at 37 to provide bottle-guiding portions.

The angles $a$, formed by the tangents to the bottle-contacting surfaces of the curls 36, are substantially the same as the angles formed by the groove walls at their places of juncture with the cylindrical surfaces, and are equal to approximately 40–50 degrees, as mentioned, in order to insure that pull on the bottle in the forward direction, i.e. away from the bracket, causes the curls 36 to spread outwardly and thus permit the withdrawal of the bottle.

The lower end of the piece 30 is bent horizontally to provide an extension or tongue 40, reaching in the installed position of the bottle under the bottom thereof to the other side, whereat it is bent upwardly to form an upward extension 42 having an inwardly directed curl 44 provided on its end designed to engage the bottle at the peripheral groove 28, as is best shown in FIG. 1. At the extremity of the curl 44 there is provided an upwardly extending bottle-guiding portion 45.

In operation, with the holder bracket 16 installed in an engine compartment, the bottle 15 filled with liquid additive is inserted into the holder bracket 16 by placing its front lower edge on the bottle-guiding extension 45, causing it to slide down toward the horizontal tongue 40, with the lower edge of the bottle on the opposite side contacting the bottle-guiding ramp 32 and the upper portion of the cylindrical body of the bottle contacting the portions 37 of the clip 35, spreading the clip apart.

As the bottle is forced further in, the curls 36 enter the grooves 26, while the tongue 40 enters the diametral recess 29. Thus, the bottle 15 is placed into the bracket 16 assuming the position illustrated in FIG. 1.

It will be understood that with the above-described construction, the bottle 15 may go into the bracket 16 in two positions. The second position results when the bottle is turned to have the grooves of the "near pair" 25 come to the front and become, in effect, the "far pair" of the grooves. With such a construction the bottle may be received by the holder in either of two positions. Therefore it may be desirable to have two labels in order to have one label always in front. However, under usual conditions only one label may be sufficient. When the bottle is held by engagement of grooves 26, the grooves 25 are ineffective for engagement with the bracket. However, their provision permits use of the second position of the bottle in the bracket, and they provide a better hand hold in withdrawing the bottle.

It should be noted further that due to the considerable distance between the grooves 25 and 26, the clip 35 embracing the bottle reaches far in front of the bottle, requiring spreading the clip for a considerable distance, and thus insuring resilient action of the clip through such distance and, therefore, sufficient resilient hold of the bottle.

Figure 12:
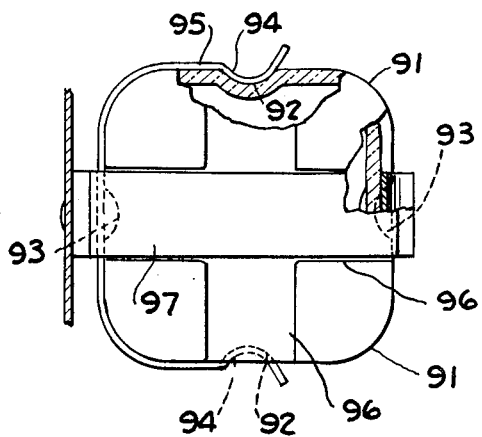
FIG. 12 is a sectional view taken in the direction of the arrows on the section plane passed through the section line 12—12 of FIG. 11.

It will be understood that if only pair of grooves is provided on the bottle of a round cross section, it should be substantially in the non-diametral arrangement. If a diametral arrangement similar to the construction of FIG. 12 is used, the distance of spreading the clip will be considerably decreased. While such a construction may be desirable in the bottles of square cross section, as in the construction of FIGS. 12–13, I prefer to use in the bottles of round cross section either two pairs of such grooves, although the distance between the two pairs may be varied to suit conditions, or one pair in a non-diametral arrangement, i.e. using only one pair, 25 or 26.

FIGS. 6, 7, and 8 illustrate a device including a bottle in which two pairs of grooves 50 and 51 are arranged as close as practicable. In such a construction the distance through which the ends of the clip 53 of the bracket act resiliently and have to be spread for withdrawal of the bottle 54, is decreased but still their snapping action and reaching the front side of the bottle with the ends of the clip is preserved. Such a construction may be desired, for instance, when heavy stock is used in the construction of the holder bracket to provide a particularly strong hold on the bottle and where the distance of spreading the clip should not be excessively large as presenting the danger of overstraining the material of the cilp beyond its elastic limit.

The construction of FIG. 4 illustrates a device in which the peripheral groove, such as groove 28 of the construction of FIGS. 1–3, is eliminated and the two pairs of grooves 60 and 61 are extending further down. The holder bracket in this device is provided with an additional bottle-embracing clip 59 which may be identical wth the upper bottle-embracing clip 62. The end walls at both the upper and lower ends of the grooves 60 and 61 are made substantially square, as indicated at 63 in FIG. 4a, in order to have the edges of the groove-engaging curls of the clip 62 and 63 bear thereon and thus resist both the upward and downward movement of the bottle. With such a construction provision of the tongue, such as tongue 40, in the holder bracket and of the recess, such as recess 29 of the construction of FIGS. 1-3, is not necessary. In other respects the operation of this device is substantially similar to that of the construction of FIGS. 1-3.

FIG. 5 illustrates a construction similar in part to that of FIGS. 1-3, but using a raised peripheral bead 66 instead of a groove, such as 28, and therefore having the curl 67 shaped correspondigly, as illustrated.

FIG. 9 illustrates a device similar in part to that of FIG. 4 with the exception that the two pairs of grooves 68 and 69 are arranged closely adjacent to each other, is in the construction of FIGS. 6-8. In this construction the upper and lower clips 70 and 71 are substantially identical and are similar in construction to the clip 53 of FIG. 8.

The construction illustrated in FIG. 10 comprises a bottle 75 having two pairs of indentations 76 and 77 with the "far pair" of such indentations, the pair of grooves 77 in the position illustrated in FIG. 10, engageable by the curls 78 of the clip 79, which clip is substantially similar in its construction to the clip 53 of FIG. 8. The lower walls of the indentations 76 and 77 bear, in the installed position of the bottle, on the lower edges of the indentation-engaging curl of the clip 79, whereby upward movements of the bottle are positively resisted being cushioned, however, to some extent by bodily resiliency of the entire holder bracket. The weight of the bottle 75 is supported by the tongue 80 having an upward extension 81 preventing forward movement of the lower portion of the bottle. Provision of a peripheral groove or bead and a corresponding curl on the upward extension, such as 81, is not necessary in this construction since the upward movements of the bottle are resisted by the clip 79, as mentioned. This bottle may be received by the holder in two positions.

Figure 13:
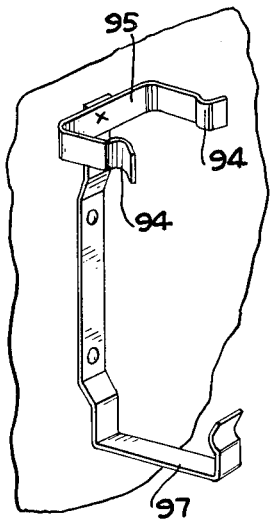
FIG. 13 is a perspective view showing separately the holder bracket of the construction of FIG. 11.

FIGS. 11-13 illustrate a device including a bottle 90 which is of a square cross section with rounded corners, as indicated at 91. The bottle 90 is provided with two pairs of grooves 92 and 93 in a close arrangement, which grooves are engageable by the curls 94 of the clip 95. The bottom of the bottle 90 is provided with a cross-shaped recess 96 to receive the lower tongue 97 of the bracket. The bottle of this construction may go into its holder bracket in four positions, which may be a very important feature in many situations.

It will be understood that the bottles in the constructions of FIGS. 1, 6 and 11, because of the considerable vertical extent of their respective grooves, may be held in brackets in which the distance from the lower bottle-supporting tongue and of the clip varies. Also, the same clip may receive a much higher bottle than those illustrated in the drawings.

By virtue of the above-disclosed constructions, the objects of the present invention and the numerous additional advantages are attained.

I claim:

1. A device for holding a supply of liquid additive for a windshield washer water container of a motor vehicle, said device comprising a bottle having a body with a bottom and a converging top forming a throat, at least one pair of elongated vertically extending grooves provided one on each of the two sides of the bottle body symmetrically with respect to the plane passing through the axis of the bottle and extending through a substantial portion of the bottle body, a peripheral groove provided on the bottle near the bottom thereof, and a bracket made of spring material and adapted to be installed in an engine compartment of a motor vehicle to receive said bottle, said bracket comprising a strip of spring material having its lower end bent to provide an extension reaching under the bottom of the bottle to the other side thereof, and a C-shaped bottle-embracing clip provided at the top of said bracket and adapted to embrace said bottle near the top thereof, the ends of said clip being formed to engage said grooves on the opposite sides of the bottle and intermediately their respective ends to resist yieldingly and resiliently the transverse movements and rotation of the bottle, with the extension of the lower end of the bracket being turned up to extend, when the bottle is in place in the bracket, toward said peripheral groove and having the end of said extension shaped to engage said groove and to resist yieldingly and resiliently the upward movements of the bottle.

2. A device for holding a supply of liquid additive for a windshield washer water container of a motor vehicle, said device comprising a bottle having a prismatic body of a square cross section with well rounded corners, a bottom and a tapering top forming a neck; said body being provided with at least two grooves having sides sloping at approximately 45° and arranged on both sides of the body centrally of the plane passed through axis of the body and extending substantially through the entire height of said body, a peripheral groove provided on said body between the lower ends of said grooves and the bottom of the bottle body, and a bracket made of spring material and adapted to be installed in an engine compartment of a motor vehicle to receive said bottle, said bracket comprising a strip of spring material having its lower end bent to provide an extension reaching under the bottom of the bottle to the other side thereof, and a C-shaped bottle-embracing clip provided at the top of said bracket and adapted to embrace said bottle from both sides thereof at said grooves, the bottom of the bottle being provided with at least one recess extending from one side of the bottle to the other and adapted to receive said extension, with the end of said extension being turned up to engage the bottle in its installed position at said peripheral groove, whereby movements of said bottle in the bracket are positively resisted, except movements in the direction of withdrawing the bottle from the bracket which movements are resisted yieldingly and resiliently.

3. The device defined in claim 2 and having four vertically extending grooves in a cross arrangement, and the bottom recess being of the cross shape.

References Cited by the Examiner

UNITED STATES PATENTS

| | | | |
|---|---|---|---|
| 3,033,404 | 5/62 | Adell | 215—100 |
| 3,033,405 | 5/62 | Adell | 215—100 |

JOSEPH R. LECLAIR, *Primary Examiner.*

FRANKLIN T. GARRETT, *Examiner.*